United States Patent [19]
Ackermann

[11] 3,783,365
[45] Jan. 1, 1974

[54] BATTERY CHARGING ARRANGEMENT WITH AUTOMATIC CHARGE TERMINATION CIRCUIT HAVING INPUT RIPPLE SUPPRESSION

[75] Inventor: Karl Ackermann, Berlin, Germany

[73] Assignee: Robert Bosch Photokino GmbH, Stuttgart, Germany

[22] Filed: May 26, 1972

[21] Appl. No.: 257,332

[30] Foreign Application Priority Data
May 28, 1971 Germany............P 21 26 528.1

[52] U.S. Cl. .................................................. 320/39
[51] Int. Cl. ............................................. H02j 7/04
[58] Field of Search .................... 320/39, 40, 20–23, 320/11

[56] References Cited
UNITED STATES PATENTS
3,487,284  12/1969  Cady................................ 320/40 X Primary Examiner—James D. Trammell
Assistant Examiner—Robert J. Hickey
Attorney—Michael S. Striker

[57] ABSTRACT

The control voltage for a circuit terminating the charging process of a battery being charged from an A.C. voltage source through first rectifiers is derived from a common point of a second rectifier connected with reversed polarity to one battery output terminal and a first capacitor connected in series with said second rectifier and also connected to the output of a D.C. reference voltage source. The D.C. reference voltage source is a second capacitor connected through a diode and resistor to an additional winding of the output transformer of the A.C. voltage source. A discharge resistor connected in parallel with the first capacitor allows discharge thereof when the A.C. output voltage decreases.

6 Claims, 1 Drawing Figure

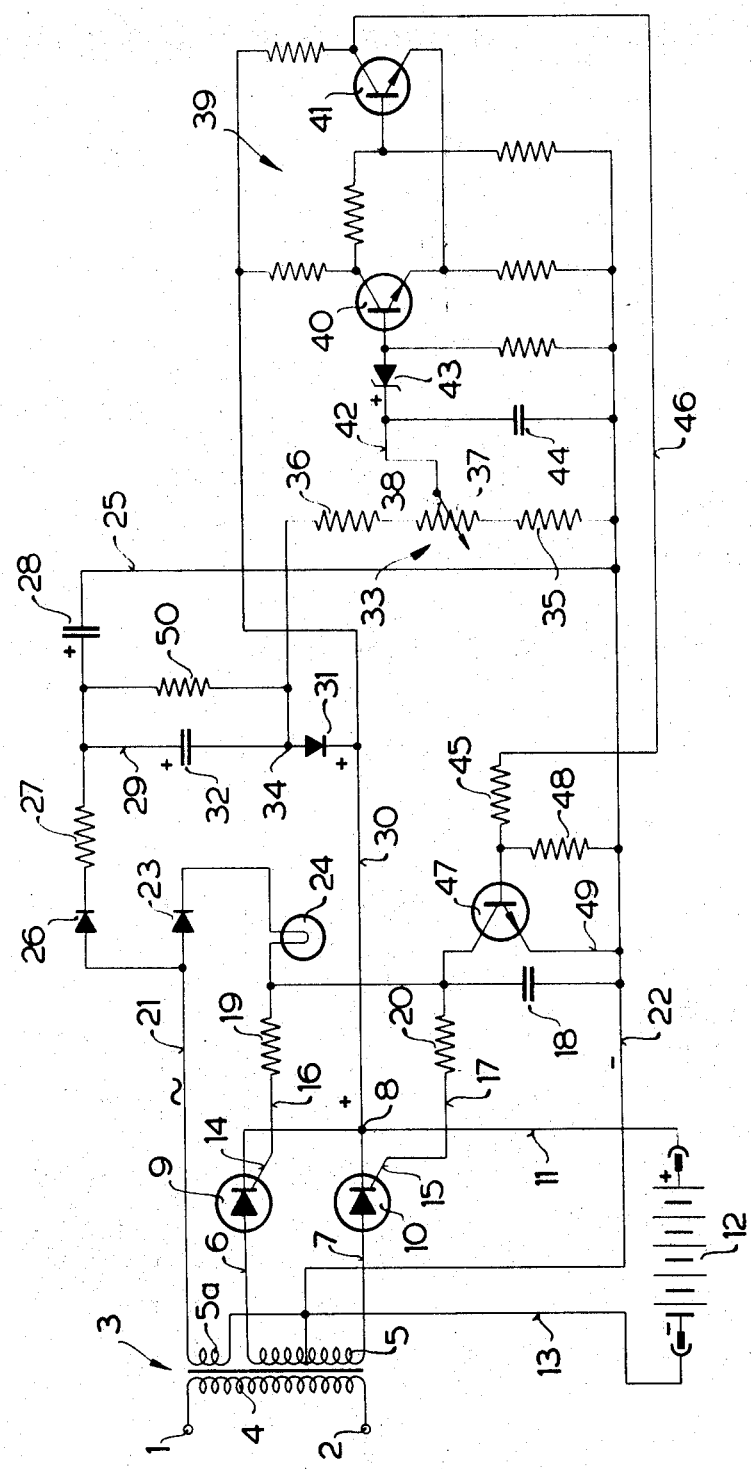

3,783,365

BATTERY CHARGING ARRANGEMENT WITH AUTOMATIC CHARGE TERMINATION CIRCUIT HAVING INPUT RIPPLE SUPPRESSION

BACKGROUND OF THE INVENTION:

This invention relates to battery charging arrangements and particular to such arrangements wherein a battery is charged from an A.C. voltage source through first rectifier means. In particular it refers to such arrangement wherein first circuit means are provided which terminate the charging of the battery when the voltage at a rectifier output terminal has a predetermined magnitude.

In conventional equipments of the above-described type, the voltage at the first rectifier output terminal comprises the battery output voltage as well as an A.C. half wave voltage superimposed thereon. The size of the superimposed A.C. voltage depends upon the charging current, whose magnitude in turn depends upon the instantaneous value of A.C. voltage at the output of the A.C. voltage source. The latter, as is well known, undergoes rather large variations. The above-mentioned first circuit means are so designed that they respond to a voltage of particular amplitude, which corresponds to the desired output voltage of the battery. However, since the D.C. voltage of the battery has superimposed thereon the A.C. half wave voltages, the threshold of the threshold stage which constitutes the input of the above-mentioned first circuit means is not determined by the battery output voltage alone as is desirable, but by the average value corresponding to the battery output voltage and its superimposed A.C. component. Of course the proportion of the rectifier output voltage contributed by the A.C. component depends upon the instantaneous value of the A.C. output voltage. Thus in conventional equipment in the presence of high A.C. output voltages and a resulting high charging current it is possible that the first circuit means terminate the charging process immediately upon the commencement thereof, and before the battery has been charged to anywhere near the desired output voltage.

SUMMARY OF THE INVENTION

It is the object of the present invention to prevent the above-described early termination of the charging process of the battery.

In particular, it is an object of the present invention to furnish an input voltage to the first circuit means terminating the charging process, which is substantially independent of the ripple voltage appearing at the output of the first rectifier means.

This invention therefore comprises an arrangement for charging a battery having a first and second battery output terminal from an A.C. voltage source through first rectifier means connected to said A.C. voltage source. It comprises first circuit means having a threshold input stage for terminating said charging of said battery in response to a threshold input voltage having a predetermined magnitude. It further comprises a source of D.C. reference voltage. Further, second rectifier means are connected to said first battery output terminal with opposite polarity thereto and first capacitor means are connected in series with said second rectifier means and are further connected to the output of said source of D.C. reference voltage, whereby the voltage across said first capacitor means corresponds to the difference between said D.C. reference voltage and the D.C. voltage across said battery. Further, connecting means are provided which connect the common point of said first capacitor means and said second rectifier means herein referred to as the control point to the input of said threshold input stage in such a manner that the voltage at said control point constitutes said threshold input voltage.

In a circuit of the above-described type, the voltage at the control point mentioned above is independent of the A.C. voltage superimposed upon the battery output voltage. Specifically, the A.C. voltage peak are blocked from the above-mentioned control point by the second rectifier means. The voltage at said control point is thus free of the A.C. component and corresponds in magnitude only to the D.C. battery output voltage in addition to the voltage dropped across the second rectifier means. Thus the charging process is terminated only when the battery output voltage has attained the desired value, substantially independently of any variations in the A.C. voltage source. It is a further advantage of the above-described arrangement that this result is achieved with very little additional equipment.

In a particular preferred embodiment of the present invention, the source of D.C. reference voltage comprises a capacitor which is connected in parallel with the series circuit comprising the first capacitor, second rectifier means and battery, this second capacitor being connected to a secondary winding of the supply transformer furnishing the A.C. voltage via third rectifier means.

Further, in a preferred embodiment of the present invention the connecting means connecting the common point of the first capacitor and second rectifier means to the input of the first circuit means comprises a voltage divider which is connected from said common point to the second battery output terminal and has a tap connected to the input of the threshold input stage of said first circuit means.

Further in accordance with the present invention, discharge resistor means are connected in parallel with said first capacitor means in order to permit the discharge thereof when the A.C. output voltage decreases. In this manner the voltage across said first capacitor means is always proportional to the difference between said D.C. reference voltage and the D.C. voltage across said battery.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a schematic diagram of the present invention.

DESCRIPTION OF THE PREFERRED EMBODIMENT

A preferred embodiment of the present invention will now be described with reference to the drawing.

A transformer 3 having a primary winding 4 is plugged into the power source at terminals 1 and 2. The transformer 3 with its secondary windings 5 and 5a constitute part of the A.C. voltage source. End terminals 6 and 7 of secondary winding 5 are respectively connected to the anodes of thyristors 9 and 10 whose cathodes are connected in common at point 8. Point 8 is also connected via a line 11 to the positive side of the battery 12 which is being charged. The negative side of the battery being charged is connected via a line 13 to the center tap of secondary winding 5. Thyristors 9 and 10 constitute a full wave rectifier circuit when conductive.

The gates 14 and 15 of thyristors 9 and 10 are connected to the positive side of a capacitor 18 through lines 16 and 17 respectively. Further, current limiting resistors 19 and 20 is arranged, respectively, in lines 16 and 17. The negative side of capacitor 18 is connected via negative line 22 to the center tap of secondary winding 5 which in turn is directly connected to one side of secondary winding 5a. The positive side of capacitor 18 is connected to the other side of winding 5a through a rectifier 23 and a lamp 24. Specifically, the anode of rectifier 23 is connected to winding 5a via a conductor 21.

Further connected to line 21 is a series circuit comprising a rectifier 26, herein referred to as third rectifier means, a resistor 27, herein referred to as filter resistor means, and a capacitor 28, herein referred to as second capacitor means. The other terminal of capacitor 28 is connected to negative line 22 via a line 25. A capacitor 32 (first capacitor means) has a positive terminal connected to the common point of resistor 27 and capacitor 28 via a line 29. The second terminal of capicitor 32 is connected to a control point 34, which control point 34 is connected to the anode of a diode 31 whose cathode is connected to the above-mentioned circuit point 8 via a line 30.

A voltage divider 33 is connected from control point 34 to the negative line 22. Voltage divider 33 comprises two fixed resistors 35 and 36 and a potentiometer 37. At the tap 38 of potentiometer 37 is connected the input of first circuit means, namely a switching circuit 39 which, in the embodiment shown in the Figure, is a conventional Schmitt trigger circuit having an input transistor 40 and an output transistor 41. Trigger circuit 39 is so designed that it switches and thereby interrupts the charging current for battery 12 when a voltage appears at the base of input transistor 40 which corresponds to the desired voltage of battery 12. As mentioned above, the voltage appearing at the output of the first rectifier means, that is the voltage appearing between point 8 and line 22, corresponds in magnitude to the average value of the battery output voltage and the A.C. component superimposed upon said D.C. output voltage of said battery. When the A.C. voltage increases above its nominal value, the proportion of the voltage appearing between point 8 and line 22 which is due to the A.C. component becomes relatively large. Thus it can happen that the voltage appearing at the tap of the voltage divider means exceeds the threshold voltage thereby terminating the charging process even though the battery is not as yet fully charged.

In order to prevent the above-mentioned early termination of the charging process, in accordance with the present invention, the A.C. component is separated from the D.C. battery voltage so that only the pure D.C. battery voltage appears across voltage divider 33. This is accomplished by means of circuit components 28, 31 and 32. Capacitor 28 charges via diode 26 and resistor 27 to a voltage of, for example, 15 volts. The voltage across capacitor 32 then becomes proportional to the difference between the voltage across capacitor 28, namely the D.C. reference voltage, and the D.C. voltage across battery 12. Because of the polarity of diode 31, the magnitude of voltage across capacitor 32 is dependent solely on the D.C. voltage across battery 12. The A.C. components appearing at point 8 herein to as a common point are blocked by diode 32, so that these A.C. components cannot influence the charge on capacitor 32. Thus control point 34 has a voltage which corresponds in magnitude to the pure D.C. voltage across the battery, increased by the voltage drop across diode 31. A resistor 50 (discharge resistor means) is connected in parallel with capacitor 32. Capacitor 32 discharges through said resistor when the A.C. output voltage decreases.

The base of transistor 40 is connected to the anode of a Zener diode 43, whose cathode is connected via a line 42 with voltage divider tap 38. The cathode of Zener diode 43 is further connected to a capacitor 44 whose other terminal is connected to negative line 22.

The collector of output transistor 41 is connected to the negative line 22 via a line 46, a resistor 45 and a resistor 48. The common point of resistors 45 and 48 is connected to the base of a transistor 47. The emitter of transistor 47 is connected to negative line 22 via a line 49, while its collector is connected to the positive side of capacitor 18. The emitter-collector circuit of transistor 47 is thus in parallel with capacitor 18. Thus when transistor 47 is conductive, capacitor 18 discharges over said emitter-collector circuit of said transistor and thus causes thyristors 9 and 10 to switch from a conductive to a non-conductive state.

The operation of the above-described battery charging arrangement is as follows:

When terminals 1 and 2 are first plugged into the power source, thyristors 9 and 10 are blocked. Therefore no charging current flows into battery 12. Capacitor 18 charged via diode 23 and lamp 24 to a predetermined voltage which may for example be 15 volts. Simultaneously capacitor 28 charges via diode 26 and resistor 27 to a predetermined D.C. voltage. The charge of capacitor 32 is determined by the D.C. reference voltage developed across capacitor 28 and the battery voltage which opposes this D.C. reference voltage. Thus the voltage developed at control point 34 is a D.C. voltage which is independent of the A.C. component superimposed upon the D.C. battery voltage, and therefore corresponds to the pure D.C. battery voltage increased by the voltage drop across diode 31.

The voltage across capacitor 18 is applied via the current limiting resistors 19 and 20 to the gates 14, 15 of thyristors 9 and 10 respectively. The voltage at the cathodes of the thyristors corresponds to the battery output voltage which may for example be 7.5 volts and is thus considerably less than the voltage across capacitor 18. Thus the voltage applied to the gates 14, 15 of the thyristors is larger then the voltage across the battery. A control current flows, which causes thyristors 9 and 10 to switch to the conductive state. Capacitor 18 operates as a storage capacitor and thus causes thyristors 9 and 10 to remain in the conductive state and thereby to operate as conventional diodes, as long as capacitor 18 is charged.

As the charging process continues, the battery voltage increases and, depending on the type of battery may have a more or less defined change in voltage when full charge is attained. As soon as the D.C. voltage across the battery and the voltage across capacitor 44 which is proportional thereto exceeds a predetermined value, Zener diode 43 becomes conductive, thereby switching trigger circuit 39. The predetermined magnitude of the threshold input voltage which causes firing of the trigger may of course be adjusted by adjusting potentiometer 37. When said predetermined magnitude of threshold input voltage is exceeded, input transistor 40 changes from the blocked to the conductive state, while, simultaneously, output transistor 41 changes from the conductive to the blocked state. The voltage at the collector of transistor 41 thereby increases to the battery output voltage. A corresponding current flows through resistors 45 and 48 which causes transistor 47 to become conductive, causing capacitor 18 to discharge via the collector-emitter circuit of said transistor 47. Because of this discharge of capacitor 18, the voltage at gates 14 and 15 of thyristors 9 and 10 becomes more negative than the voltage at the cathodes thereof, causing thyristors 9 and 10 to be switched to the blocked state. The charging of the battery is thereby terminated.

While the invention has been illustrated and described as embodied in a specific type of battery charge terminating arrangement, it is not intended to be limited to the details shown, since various modifications and circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

I claim:

1. Arrangement for charging a battery having a first and second battery output terminal from an AC voltage source through first rectifier means having an input connected to said AC voltage source and an output directly connected to said first battery output terminal at a common point, comprising, in combination, first circuit means having a threshold input stage, for terminating said charging of said battery in response to a threshold input voltage having a predetermined magnitude; a source of DC reference voltage; first capacitor means connected to said source of DC reference voltage; second rectifier means connected to said first capacitor means between to said common point and a control point for blocking AC components at said common point from said control point; and connecting means for connecting said control point to said input stage of said first circuit means in such a manner that the voltage at said control point constitutes said threshold input voltage.

2. An arrangement as set forth in claim 1, wherein said source of D.C. reference voltage comprises second capacitor means, and third rectifier means interconnecting said second capacitor means and said A.C. voltage source.

3. Arrangement for charging a battery having a first and second battery output terminal from an A.C. voltage source through first rectifier means connected to said A.C. voltage source, comprising, in combination, first circuit means having a threshold input stage for terminating said charging of said battery in response to a threshold input voltage having a predetermined magnitude; second rectifier means connected to said first battery output terminal with opposite polarity thereto; first capacitor means connected in series with said second rectifier means at a control point; a source of D.C. reference voltage comprising second capacitor means, and third rectifier means interconnecting said second capacitor means and said A.C. voltage source; first connecting means connecting said source of D.C. reference voltage to said first capacitor means in such a manner that the voltage across said first capacitor means corresponds to the difference between said D.C. reference voltage and the D.C. voltage across said battery; and second connecting means connecting said control point to said input stage of said first circuit means in such a manner that the voltage at said control point constitutes said threshold input voltage.

4. An arrangement as set forth in claim 3, further comprising filter resistor means connected between said third rectifier means and second capacitor means.

5. An arrangement as set forth in claim 3, further comprising discharge resistor means connected in parallel with said first capacitor means, to permit discharge of said first capacitor means in response to decrease of said A.C. voltage.

6. An arrangement as set forth in claim 3, wherein said connecting means comprise voltage divider means connected from said common point to said second battery output terminal, said voltage divider means having a tap; and means connecting said tap to said input of said threshold stage of said first circuit means.

* * * * *